United States Patent
Fu et al.

(10) Patent No.: US 8,682,910 B2
(45) Date of Patent: Mar. 25, 2014

(54) DATABASE ANONYMIZATION FOR USE IN TESTING DATABASE-CENTRIC APPLICATIONS

(75) Inventors: Chen Fu, Lisle, IL (US); Mark Grechanik, Chicago, IL (US); Qing Xie, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 90 days.

(21) Appl. No.: 12/849,127

(22) Filed: Aug. 3, 2010

(65) Prior Publication Data

US 2012/0036135 A1    Feb. 9, 2012

(51) Int. Cl.
*G06F 17/30* (2006.01)

(52) U.S. Cl.
USPC .......................................... 707/752; 707/688

(58) Field of Classification Search
USPC .................................. 707/688, 752
See application file for complete search history.

(56) References Cited

U.S. PATENT DOCUMENTS

| | | | |
|---|---|---|---|
| 6,037,987 A | 3/2000 | Sethuraman | |
| 6,253,203 B1 | 6/2001 | O'Flaherty et al. | |
| 6,504,935 B1 | 1/2003 | Jackson | |
| 6,618,721 B1 | 9/2003 | Lee | |
| 7,058,638 B2 | 6/2006 | Singh | |
| 7,363,299 B2 | 4/2008 | Dalvi | |
| 7,606,788 B2 | 10/2009 | Samar | |
| 7,620,940 B2 | 11/2009 | Goldsmith et al. | |
| 7,630,986 B1 | 12/2009 | Herz et al. | |
| 7,698,250 B2 | 4/2010 | Dwork | |
| 7,716,592 B2 | 5/2010 | Tien et al. | |
| 7,769,707 B2 | 8/2010 | Dwork | |
| 7,818,335 B2 | 10/2010 | Dwork | |
| 7,925,617 B2 | 4/2011 | Mishra | |
| 7,934,190 B1 | 4/2011 | Allen et al. | |
| 7,971,131 B1 | 6/2011 | Ordentilch et al. | |
| 8,005,821 B2 | 8/2011 | Dwork et al. | |
| 8,051,033 B2 | 11/2011 | Kenedy et al. | |
| 2002/0169793 A1 | 11/2002 | Sweeney | |
| 2002/0176494 A1 | 11/2002 | Zhao et al. | |
| 2003/0124999 A1 | 7/2003 | Parssinen et al. | |
| 2003/0161550 A1 | 8/2003 | Cheng et al. | |
| 2003/0215092 A1 | 11/2003 | Dick | |

(Continued)

OTHER PUBLICATIONS

C.C. Aggarwal & P.S. Yu. "Privacy-Preserving Data Mining: Models and Algorithms" Springer, 2008.

(Continued)

*Primary Examiner* — Khanh Pham
(74) *Attorney, Agent, or Firm* — Mannava & Kang, P.C.

(57) ABSTRACT

At least one quasi-identifier attribute of a plurality of ranked attributes is selected for use in anonymizing a database. Each of the ranked attributes is ranked according to that attribute's effect on a database-centric application (DCA) being tested. In an embodiment, the selected quasi-identifier attribute(s) has the least effect on the DCA. The database is anonymized based on the selected quasi-identifier attribute(s) to provide a partially-anonymized database, which may then be provided to a testing entity for use in testing the DCA. In an embodiment, during execution of the DCA, instances of database queries are captured and analyzed to identify a plurality of attributes from the database and, for each such attribute identified, the effect of the attribute on the DCA is quantified. In this manner, databases can be selectively anonymized in order to balance the requirements of data privacy against the utility of the data for testing purposes.

19 Claims, 4 Drawing Sheets

(56) References Cited

U.S. PATENT DOCUMENTS

| | | | |
|---|---|---|---|
| 2004/0049517 A1 | 3/2004 | Singh | |
| 2006/0059189 A1* | 3/2006 | Dunki et al. | 707/102 |
| 2006/0123462 A1 | 6/2006 | Lunt et al. | |
| 2007/0083493 A1 | 4/2007 | Dwork et al. | |
| 2007/0130147 A1 | 6/2007 | Dwork et al. | |
| 2007/0136027 A1 | 6/2007 | Dwork et al. | |
| 2007/0143289 A1 | 6/2007 | Dwork et al. | |
| 2007/0146631 A1 | 6/2007 | Sinclair et al. | |
| 2007/0147606 A1 | 6/2007 | Dwork | |
| 2007/0256061 A1 | 11/2007 | Victorov | |
| 2008/0209568 A1 | 8/2008 | Chang et al. | |
| 2008/0275900 A1* | 11/2008 | Zurek | 707/102 |
| 2009/0144303 A1* | 6/2009 | Bhide et al. | 707/101 |
| 2009/0254971 A1 | 10/2009 | Herz et al. | |
| 2010/0162402 A1* | 6/2010 | Rachlin et al. | 726/26 |
| 2010/0329490 A1 | 12/2010 | Van Schijndel et al. | |
| 2011/0041184 A1 | 2/2011 | Cormode et al. | |
| 2011/0052087 A1 | 3/2011 | Mukherjee | |
| 2011/0119661 A1* | 5/2011 | Agrawal et al. | 717/154 |
| 2011/0231661 A1 | 9/2011 | Ramakrishnan et al. | |

OTHER PUBLICATIONS

W. Aspray, F. Mayades, and M. Vardi. "Globalization and Offshorting of Software", ACM, 2006.

E. Bruneton, R. Lenglet, and T. Coupaye. "ASM: a code manipulation tool to implement adaptable systems." in Proc. ACM SIGOPS France, Nov. 2002.

C. Cadar, D. Dunbar, and D.R. Engler. "Klee: Unassisted and automatic generation of high-coverage tests for complex systems programs." In Proc. 8th USENIX OSDI, pp. 209-224, USENIX, Dec. 2008.

M. Castro, M. Costa, and J.P. Martin, "Better bug reporting with better privacy." In Proc. 13th ASPLOS, pp. 319-328, ACM, Mar. 2008.

J. Clause, W. Li, and A. Orso, "Dytan: a generic dynamic tain analysis framework", in ISSTA '07, pp. 196-206, New York NY USA 2007, ACM.

G.A. Cohen, J.S. Chase, and D.L. Kaminsky, "Automatic program transformation with Joie", in Proc. USENIX Annual Technical Symposium, pp. 167-178. USENIX, Jun. 1998.

G. Cormode and D. Srivastava, "Anonymized data: generation, models, usage." In Proc. 35th ACM SIGMOD, pp. 1015-1018, ACM 2009.

C. Csallner, N. Tillmann, and Y. Smaragdakis. "DySy: Dynamic symbolic execution for invariant inference." In Proc. 30th ACM/IEEE ICSE, pp. 281-290, ACM, May 2008.

L.K. Dillon and Q. Yu, Oracles for checking temporal properties of concurrent systems. In ACM SIGSOFT '94, pp. 140-153, Dec. 1994.

M. Emmi, R. Majumdar, and K. Sen. Dynamic test input generation for database applications. In ISSTA, pp. 151-162, 2007.

P. Godefroid, N. Klarlund and K. Sen. "Dart: Directed automated random testing." In Proc. ACM SIGPLAN PLDI, pp. 213-223, ACM, Jun. 2005.

M.J. Harrold, R. Gupta and M.L. Soffa. "A Methodology for controlling the size of a test suite." ACM Trans. Softw. Eng. Methodol., 2(3):270-285, Jul. 1993.

G.M. Kapfhammer and M.L. Soffa. "A family of test adequacy criteria for database-driven applications." In Proc. 11th ACM SIGSOFT FSE, pp. 98-107, ACM, 2003.

J.M. Kim and A.A. Porter. "A history-based test prioritization technique for regression testing in resource constrained environments." In ICSE, pp. 119-129, 2002.

W. Landi. "Undecidability of static analysis." ACM Lett. Program. Lang. Syst. 1(4): 323-337, 1992.

K. LeFebre, D.J. DeWitt, and R. Ramakrishnan. "Mondrian multidimensional k-anonymity." In Proc. 22nd ICDE, p. 25, IEEE, 2006.

J. Nin, J. Herranz, and V. Torra. "Attribute selection in multivariate microaggregation." In Proc. PAIS, pp. 51-60. ACM, 2008.

D. Peters and D.L. Parnas, "Generating a test oracle from program documentation: work in progress" In ISSTA '94, pp. 58-65, New York NY USA, 1994, ACM Press.

X. Ren, F. Shah, F. Tip, B.G. Ryder, and O. Chesley, "Chianti: a tool for change impact analysis of java programs." In OOPSLA, pp. 432-448, 2004.

D.J. Richardson. "Taos: Testing with analysis and oracle support." In ISSTA '94: Proceedings of the 1994 ACM SIGSOFT ISSTA, pp. 138-153, New York NY USA, 1994, ACM Press.

D.J. Richardson, S. Leif-Aha, and T.O. O'Malley. "Specification-based Test Oracles for Reactive Systems." in Proceedings of the 14th ICSE, pp. 105-118, May, 1992.

P. Samarati. "Protecting respondents' identities in a microdata release". IEEE Trans. Knowl. Data Eng., 13(6): 1010-1027, 2001.

R.A. Santelices, P.K. Chittimalli, T. Apiwattanapong, A. Orso, and M.J. Harrold. "Test-suite augmentation for evolving software." In ASE, pp. 218-227, 2008.

K. Sen and G. Agha. "Cute and jCute: Concolic unit testing and explicit path model-checking tools" In Proc. CAV, pp. 419-428, Springer, Aug. 2006.

L. Sweeney. "k-Anonymity: A model for protecting privacy." International Journal of Uncertainty, Fuzziness and Knowledge-Based Systems, 10(5): 557-570, 2002.

H. Zhu, P.A.V. Hall and J.H.R. May. "Software unit test coverage and adequacy." ACM Comput. Surv. 2(4): 366-427, 1997.

"Maximizing Privacy Under Data Distortion Constraints in Noise Perturbation Methods", Rachlin, Probst, Ghani, presented at: 2nd ACM SIGKDD International Workshop on Privacy, Security and Trust in KDD (PinKDD), Aug. 24, 2008.

"Security-control Methods for Statistical Databases", Adam and Wortman, ACM Computing Surveys, 21(4), 1989.

"On Randomization, Public Information and the Curse of Dimensionality", Aggarwal, IEEE International Conference on Data Engineering, 2007.

"On Unifying Privacy and Uncertain Data Models", Aggarwal, IEEE International Conference on Data Entineering, 2008.

"Privacy-preserving Data Mining", Agrawal & Srikant, SIGMOD Rec., 29(2), 2000.

"A Face is Exposed for AOL Seacher No. 4417749", Barbaro and Zeller, New York Times, Aug. 9, 2006.

"Data Privacy Through Optimal K-Anonymization", Bayardo & Agrawal, pp. 217-228, 2005.

"Finding a Needle in a Haystack—or Identifying Anonymous Census Record", Dalenius, J. Official Statistics, 2(3) 329-336, 1986.

"On the Privacy Preserving Properties of Random Data Perturbation Techniques", Kargupta, Datta, Wang and Sivakumar, in ICDM, 2003.

"Incognito: Efficient Full-Domain K-Anonymity", LeFebre, DeWitt & Ramakrishnan, SIGMOD, 2005.

"Guessing and Entropy", Massey, in IEEE Symposium on Information Theory, 1994.

"Security of Random Data Perturbation Methods", Muralidhar and Sarathy, ACM Trans Database Syst., 24(4), 1999.

"On Measures of Entropy and Information", Renyi, In 4th Berkeley Symposium on Mathematical Statistics and Probability, 1961.

"Protecting Privacy when Disclosing Information: K-Anonymity and its Enforcement Through Generalization and Suppression", Sarnarati and Sweeney, in Proceedings of the IEEE Symposium on Research in Security and Privacy, 1998.

"Achieving K-Anonymity Privacy Protection Using Generalization and Suppression", Sweeney, International Journal on Uncertainty, Fuzziness and Knowledge-based Systems, 10(5) 571-588, 2002.

"An Inequality on Guessing and its Application to Sequential Decoding", Erdal Arikan, IEEE Transactions on Information Theory, vol. 42, No. 1, Jan. 1996.

"A Quantitative Comparison of Disclosure Control Methods for Microdata", Domingo-Ferrer and Torra, Confidentiality, Disclosure and Data Access: Theory and Practical Application for Statistical Agencies, Elsevier, pp. 111-133 (2001).

"Estimating the re-identification risk per record in microdata", Skinner, et al., Journal of Official Satistics, Statistics Sweden, Stockholm SE, vol. 14, No. 4, 1998, pp. 361-372, XP002974205.

"Protecting patient privacy by quantifiable control of disclosures in disseminated databases", Ohno-Machado, et al., International Jour-

(56) References Cited

OTHER PUBLICATIONS nal of Medical Informatics, Elsevier Scientific Publishers, Shannon, Ireland, vol. 73, No. 7-8, Aug. 2004, pp. 599-606, XP004521015.
International Search Report for PCT/EP2008/050908 issued Apr. 7, 2008 (PCT/ISA 210).
Atzori, et al., "Anonymity preserving pattern discovery" Springer-Verlag 2006.
Arikan, et al., "Guessing Subject to Distortion", IEEE May 1998.
Liu, et al., "Wavelet-Based Data Distortion for Simultaneous Privacy-Preserving and Statistics-Preserving", May 25, 2008.
Atzori, et al., "Anonymity preserving pattern discovery", Springer-Verlag 2008.
Arikan, et al., "Guessing Subject to Distortion" IEEE May 1998.
Liu, et al., "Wavelet-Based Data Distortion of Simultaneous Privacy-Preserving and Statistics-Preserving", May 25, 2008.
Extended European Search Report for EP Application 11176234 issued on May 2, 2012.
"Data Sanitzation Techniques" Jan. 24, 2009, pp. 1-10, XP55025158, retrieved from the Internet: URL: http://web.archive.org/web/20090124083826/http://datamasker.com/datasanitizationwhitepaper.pdf [retrieved on Apr. 20, 2012] *p. 1-p. 6*.
"Pex-White Box Test Generation for .NET" Nikolai Tillmann and Jonathan de Halleux, TAP 2008, LNCS 4966, pp. 134-153, 2008, B. Beckert and R. Hahnle (eds), Springer-Verlag, Berlin, Heidelberg 2008.
"Optim Integrated Data Management", IBM, Download Date: Aug. 12, 2010. <http//www-01.ibm.com/software/data/data-management/optim-solutions/>.

* cited by examiner

- PRIOR ART -

DATABASE ANONYMIZATION FOR USE IN TESTING DATABASE-CENTRIC APPLICATIONS

FIELD OF THE INVENTION

The instant disclosure relates generally to the testing of database-centric software applications and, in particular, to the anonymization of databases for use in testing such database-centric applications.

BACKGROUND OF THE INVENTION

Software applications that work in conjunction with often large, complex databases are widely know. For purposes of this disclosure, such an application is referred to as a database-centric application (DCA). It is not uncommon today for developers of DCAs to outsource the testing of a DCA to a testing entity that can perform the necessary testing more efficiently than the developer. In these situations, the testing entity is provided with an executable or object code version of the DCA along with a copy of a database comprising "real world" data for use in testing the DCA. So long as the information in the database used for this purpose does not include confidential information, the process can work well. Even in those instances where the database comprises confidential information, a sufficient level of trust in the relationship between the DCA developer and the testing entity may exist such that the developer is willing to share the otherwise confidential database with the testing entity. However, recent development of more stringent privacy laws and regulations have made it increasingly difficult for developers to share confidential information. The resulting lack of meaningful test data makes testing of the DCA difficult at best.

One solution to this problem is to create databases of "synthetic" data having the same schema as the original (confidential) database, but having fake data values therein. While this may be useful in some circumstances, such fake data typically fails to appreciate the meaning of data values or capture otherwise complex semantic relationships between data values. As a result, testing based on synthetic data is seldom, if ever, as effective (e.g., in the sense of providing more complete testing coverage of the DCA and/or in finding bugs within the DCA) as testing with real-world data.

Another solution is for the developer to maintain so-called "clean rooms" that are physically secure, on-premise environments used to store the confidential databases and run the DCA under test. In this approach, personnel from the testing entity are brought to the developer's clean room to execute the necessary testing while being subjected to intense monitoring. Obviously, this approach is cumbersome and often undermines the very efficiencies that motivated use of the testing entity in the first place.

A more common approach is to anonymize confidential databases in order to protect private information prior to providing them to a testing entity. An example of this is illustrated in FIG. 1. In particular, FIG. 1 illustrates a simple database 102 having a number of attributes (i.e., Name, Age, Zip Code, Nationality and Disease) and various records comprising specific data values in accordance with this schema. In general, attributes in a schema may be classified as a confidential attribute (e.g., Disease), an identifier attribute (e.g., Name) or a quasi-identifier attribute (e.g., Age, Zip Code, Nationality). A confidential attribute encompasses data that is considered sensitive and not to be publicly associated with a particular person or entity, whereas an identifier attribute encompasses data that is sufficient by itself to identify a particular person or entity. A quasi-identifier attribute encompasses data that by itself is insufficient to identify a person or entity but that is otherwise useful for such identification when combined with other quasi-identifier attributes or external (typically publicly available) data. For example, in FIG. 1, if it is known that there is only one Palaun living in the 51000 zip code, exposure of the database 102 even with identifier attributes (e.g. Name) completely suppressed would allow one to infer that Ann Able is afflicted with dyspepsia.

In a typical embodiment, an anonymizer 104, capable of generalizing or suppressing data within the various records, operates upon the database 102 to provide a fully anonymized database. Techniques for anonymizing data, such as k-anonymity (in which identifiers/quasi-identifiers in each record are altered to ensured each record is indistinguishable from at least k−1 other records) or L-diversity (in which effectiveness of external data is diminished by "distributing" sensitive data across groups of otherwise anonymized people/entities) are well known in the art. For example, as illustrated in FIG. 1, the database 102 has been subjected to k-anonymization where k=2. In this case, the identifier attribute (Name) has been suppressed entirely, whereas the quasi-identifier attributes (Age, Zip Code, Nationality) have been altered in some fashion to generalize or otherwise mask the quasi-identifier attribute data.

While such anonymization can ensure confidentiality of the data, it suffers from similar issues as synthetic data in that the meaning and relationships in the original data can be lost entirely, thereby significantly reducing the effectiveness of the anonymized data during testing. For example, and again with reference to FIG. 1, code that is designed to look for known data values in the Nationality attribute (e.g., American, Japanese, Palaun, etc.) is likely to generate an inordinate number of errors (or exceptions, as they are commonly called) due to the fact that this data has been generalized to Human, which is not a valid value for the code under test. Furthermore, the code that would normally be exercised during testing with the actual Nationality values would go untested as a result, thereby reducing the test coverage of the code.

A more sophisticated approach is selective anonymization, where quasi-identifiers are identified such that anonymization techniques are applied to at least some of the quasi-identifiers. By appropriately selecting the quasi-identifiers to be anonymized, balance may be achieved between the conflicting goals of ensuring confidentiality while retaining usefulness of the data for testing purposes. For this approach to be effective, however, detailed knowledge of how specific quasi-identifiers are used in a given DCA is needed in order to ensure maximum test coverage while simultaneously ensuring the desired level of confidentiality, which knowledge is not always readily attainable. To this end, different data anonymization approaches use different heuristics regarding how to select attributes as quasi-identifiers. For example, a popular heuristics for the well-known Datafly, k-anonymity algorithm is to select attributes that have a large number of distinct values, whereas the Mondrian algorithm advocates selection of attributes with the biggest range of values. While useful, these heuristics fail to capture how DCAs actually use values of attributes in order to maintain test coverage.

Thus, it would be advantageous to provide techniques that improve upon the current state of the art with regard to the anonymization of databases for testing of DCAs.

SUMMARY OF THE INVENTION

The instant disclosure describes techniques, including various methods and apparatus, for improving anonymization of databases for use in testing DCAs. Generally, the techniques described herein seek to selectively anonymize a database based on one or more quasi-identifier attributes that have the least influence or effect on the DCA and are therefore least impactful in terms of test coverage. Presuming that anonymization based on such quasi-identifier attributes still provides a desirable level of anonymity, the conflicting requirements of providing a suitable level of confidentiality while simultaneously preserving the utility of the database for testing purposes may be balanced as desired.

To this end, in one embodiment, a quasi-identifier attribute of a plurality of ranked attributes is selected for use in anonymizing a database. Each of the ranked attributes is ranked according to that attribute's effect on a DCA being tested. In an embodiment, the quasi-identifier attribute from the ranked attributes having the least effect on the DCA is selected. Subsequently, the database is anonymized based on the selected quasi-identifier attribute to provide a selectively, partially-anonymized database, which may then be provided to a testing entity for use in testing the DCA. In an embodiment, the ranked attributes are determined by providing a fully anonymized version of the database to the testing entity and testing the DCA based on the fully anonymized database. In this embodiment, as testing based on the fully anonymized database causes the discovery of exceptions and/or uncovered branches within the code of the DCA, the fully anonymized database may be modified to avoid such exceptions and/or to ensure coverage of such branches within the code. This process may be repeated until a desired test coverage parameter is met.

In another embodiment, the DCA is analyzed to identify a plurality of attributes from the database used by the DCA and, for each such attribute identified, the effect of the attribute on the DCA is quantified. Thereafter, the plurality of attributes is ranked according to the respective effects of each of the plurality of attributes on the DCA. The plurality of attributes may be identified by capturing database queries during execution of the DCA using instrumentation added to the code of the DCA. In an embodiment, the effect of a given attribute is determined by tainting variables in the DCA affected by the attribute and thereafter determining a number of statements in the DCA affected by the tainted variables. In an embodiment, those attributes of the plurality of attributes for which the number of statements is relatively larger are ranked lower in the ranked attributes, whereas those attributes of the plurality of attributes for which the number of statements is relatively smaller are ranked higher.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 2:
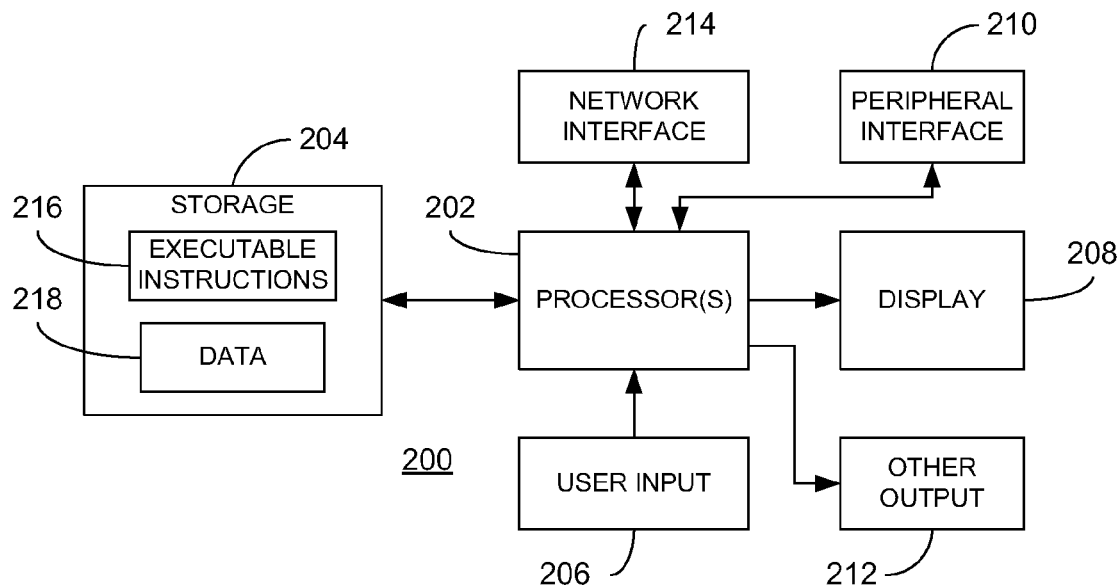
FIG. 2 is a block diagram of a processor-based platform that may be used to implement various embodiments described herein.

Referring now to FIG. 2, a representative processing device 200 that may be used to implement the teachings of the instant disclosure is illustrated. Using know programming techniques, the device 200 may be used to implement, for example, at least a portion of the processing illustrated in FIGS. 3 and 4 as well as one or more components of the system 500, as described in greater detail below. Regardless, the device 200 comprises a processor 202 coupled to a storage component 204. The storage component 204, in turn, comprises stored executable instructions 216 and data 218. In an embodiment, the processor 202 may comprise one or more processing devices such as a microprocessor, microcontroller, digital signal processor, co-processor or combinations thereof capable of executing the stored instructions 216 and operating upon the stored data 218. Likewise, the storage component 204 may comprise one or more devices such as volatile or nonvolatile memory including but not limited to random access memory (RAM) or read only memory (ROM). Further still, the storage component 204 may be embodied in a variety of forms, such as a hard drive, optical disc drive, floppy disc drive, etc. Processor and storage arrangements of the types illustrated in FIG. 2 are well known to those having ordinary skill in the art. In one embodiment, the processing techniques described herein are implemented as a combination of executable instructions and data within the storage component 204.

As shown, the device 200 may comprise one or more user input devices 206, a display 208, a peripheral interface 210, other output devices 212 and a network interface 214 in communication with the processor 202. The user input device 206 may comprise any mechanism for providing user input to the processor 202. For example, the user input device 206 may comprise a keyboard, a mouse, a touch screen, microphone and suitable voice recognition application or any other means whereby a user of the device 200 may provide input data to the processor 202. The display 208, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface. Implementation of a graphical user interface in this manner is well known to those having ordinary skill in the art. The peripheral interface 210 may include the hardware, firmware and/or software necessary for communication with various peripheral devices, such as media drives (e.g., magnetic disk or optical disk drives), other processing devices or any other input source used in connection with the instant techniques. Likewise, the other output device(s) 212 may optionally comprise similar media drive mechanisms, other processing devices or other output destinations capable of providing information to a user of the device 200, such as speakers, LEDs, tactile outputs, etc. Finally, the network interface 214 may comprise hardware, firmware and/or software that allows the processor 202 to communicate with other devices via wired or wireless networks, whether local or wide area, private or public, as known in the art. For example, such networks may include the World Wide Web or Internet, or private enterprise networks, as known in the art.

While the device 200 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 200 may include a greater or lesser number of components than those illustrated. Once again, those of ordinary skill in the art will appreciate the wide number of variations that may be used is this manner. Further still, although a single processing device 200 is illustrated in FIG. 2, it is understood that a combination of such processing devices may be configured to operate in conjunction (for example, using known networking techniques) to implement the teachings of the instant disclosure.

Figure 3:
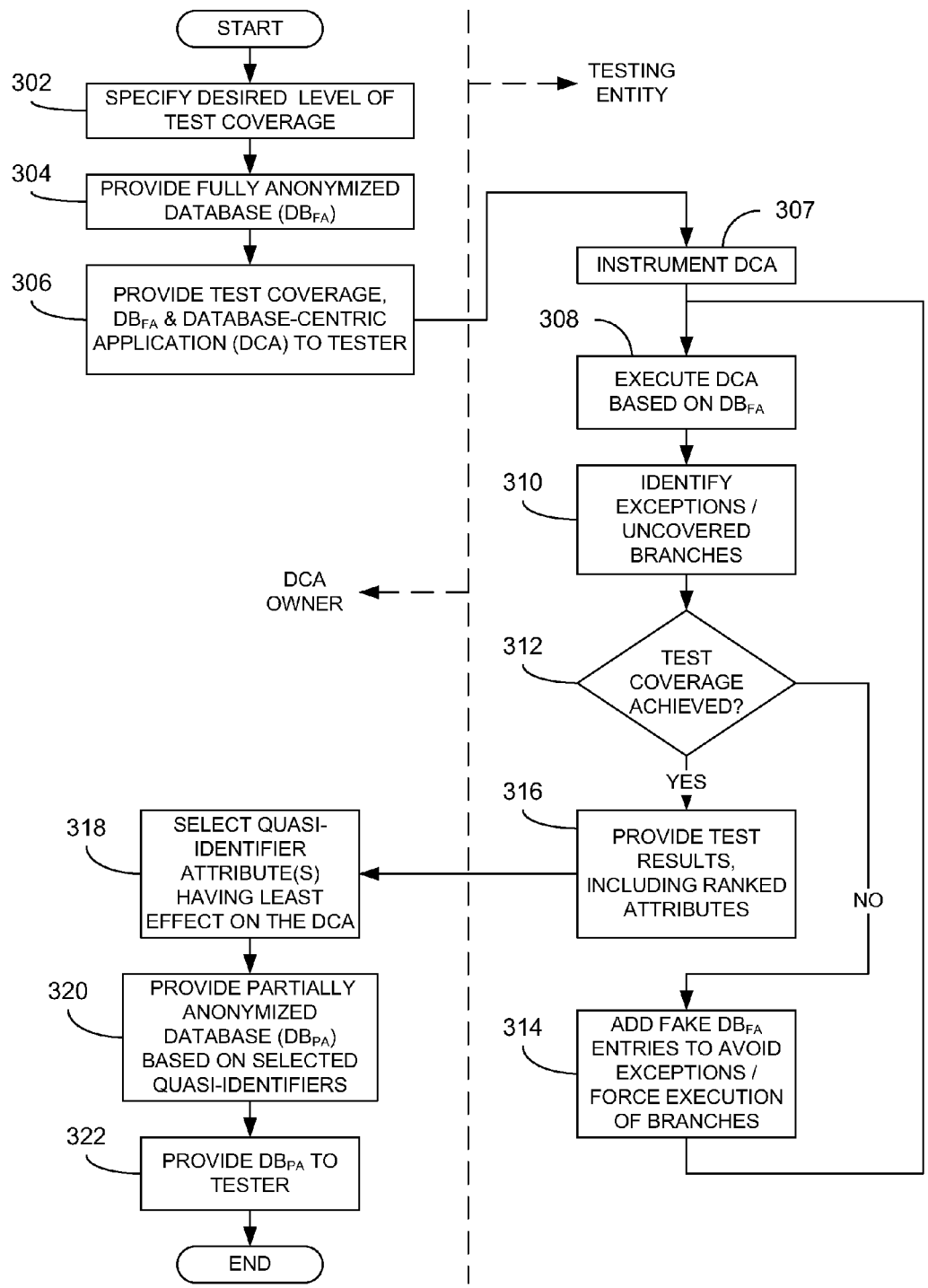
FIG. 3 is a flowchart illustrating operations for anonymizing a database in accordance with an embodiment set forth herein.

Referring now to FIG. 3, processing in accordance with an embodiment for anonymizing a database is further illustrated. In particular, the process illustrated in FIG. 3 is divided in terms of processing performed by a DCA owner on the left-hand side of FIG. 3 and processing performed by a testing entity on the right-hand side of FIG. 3. As used herein, the DCA owner is the entity (or entities) that is (are) responsible for the proper functioning of the DCA, which may include entities responsible for defining requirements of the DCA, for creating the code implementing the DCA, for marketing or using the DCA, etc. Likewise, a testing entity may comprise any party that performs testing of the DCA as a service separate from the DCA owner and that is otherwise not permitted access to confidential information in a database used to test the DCA. Generally, the processing performed by the DCA owner includes the DCA owner's team of security experts and business analysts determining, based on their domain knowledge, which attributes of the database can be used by attackers to re-identify entities and, furthermore, identifying which of those attributes should be used when selectively anonymizing a test database such that utility of the database is balanced against desired privacy goals. In turn, the processing performed by the testing entity entails testing the DCA using a fully anonymized database (i.e., a database where only selected attributes are used in anonymization) in order to determine how values of database attributes affect branch conditions, and subsequently test coverage. In other words, the testing entity determines how database attributes affect the DCA and provides the ranked attributes based on this determination back to the DCA owner.

Thus, beginning at block 302, the DCA owner first specifies a desired level of test coverage. For example, this may be expressed as a percentage of the statements constituting the DCA. As used herein, a statement is any separately identifiable, executable instruction within the code implementing the DCA. Those having ordinary skill in the art will appreciate that other measures of test coverage (e.g., percentage of control flow edges in the code or percentage of acyclic paths that exist in a control flow graph of the DCA, etc.) may be equally employed as a matter of design choice. Ideally, test coverage will always be 100%, meaning that every statement in the DCA is exercised and thereby tested during operation by the testing entity. However, in real world implementations, it is understood that 100% coverage is usually not possible given the complexity of typical DCAs. Because, unlike the testing entity, the DCA owner has detailed knowledge of the structure of the DCA's implementation, and therefore has a better feel for what level of coverage is achievable, the desired level of test coverage may be selected as target level of test coverage that the DCA owner hopes to achieve.

Figure 1:
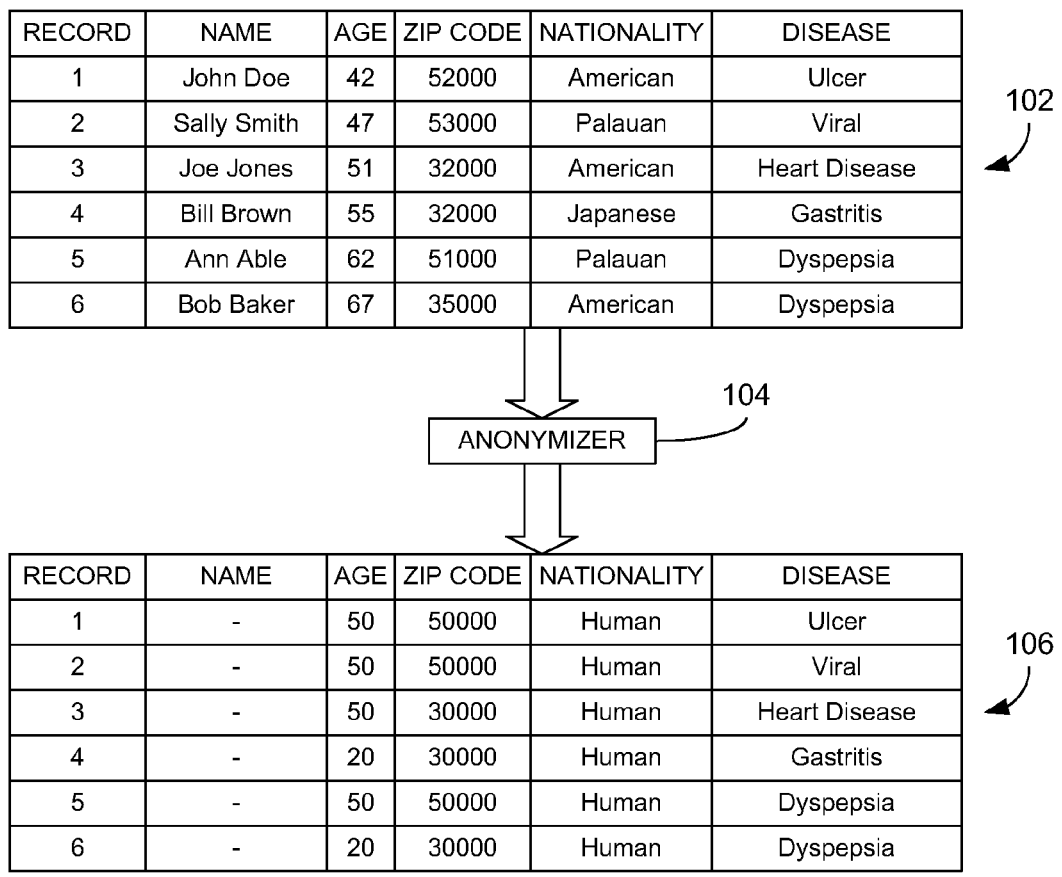
FIG. 1 is a block diagram illustrating prior art techniques for anonymizing a database.

At block 304, the DCA owner also provides a fully anonymized database ($DB_{FA}$) based on anonymization of a database comprising confidential information to be used in testing the DCA, e.g., database 102 illustrated in FIG. 1. Any suitable anonymization technique, such as k-anonymity, 1-diversity, etc. may be employed for this purpose. Commercially or publicly available applications that could be used for this purpose, include, but are not limited to the "OPTIM" application from IBM A fully anonymized database is a database in which all identifier and quasi-identifier attributes have been altered in some fashion (e.g., completely suppressed, perturbed by added noise, generalized into broad ranges, etc.) in order to prevent association of individual entities with any sensitive (confidential) data included in the database. Thereafter, at block 306, the DCA owner provides the desired level of test coverage, the fully anonymized database and DCA (in executable or object code format) to the testing entity. Any suitable communication channel may be used for this purpose.

With the DCA in hand, the testing entity first instruments the code implementing the DCA at block 307. In an embodiment, this is accomplished by inserting method calls (i.e., callbacks) before and after each instruction in the code. As known in the art, the particular nature of the instrumentation used depends on the specific language used to implement the source code and resulting object code. For example, in the case of code created using the "JAVA" programming language, the instrumentation facilities provided by "JAVA" 5 to instrument a program at load time using the so-called ASM bytecode instrumentation framework may be employed. Still other tools for this purpose are well-known to those having ordinary skill in the art. During execution of the code by the testing entity, the callbacks enable the creation and maintenance of a precise symbolic representation (described below) of each aspect of the DCA's execution state, including but not limited to the invocation stack, operand stacks, local variables, and the heap. Furthermore, the instrumentation at block 307 may include preprocessing the code with a counter that is incremented every time a new statement (e.g., an executable instruction) is encountered. As described below, the counter value thus associated with each code statement may be used as a statement identifier. With the instrumented DCA code in hand, processing continues at block 308 where the instrumented DCA code is executed in conjunction with the fully anonymized database previously provided to the testing entity.

The execution of the DCA at block 308 enables the testing entity to link database attributes to specific portions of the code in the DCA and thereby determine the effect of a given attribute on the DCA. As described in further detail below relative to FIG. 4, the effect of each attribute used by the DCA serves as the basis for providing ranked attributes as an output of the processing performed at block 308. Additionally, as part of the "linking" process, it is desirable to determine how program variables in the DCA are directly or indirectly affected by database attributes, for example, by virtue of branch condition expressions that are linked to database attributes. Executing the instrumented DCA with the fully anonymized database will lead to exceptions and uncovered branches, i.e., portions of the code that are not executed due to the alterations to the data in the fully anonymized database, which are subsequently identified at block 310. While these are normally not desired occurrences, in this instance, such exceptions and uncovered branches provide the opportunity to determine how attributes in the fully anonymized database affect the DCA.

For example, consider the branch condition in the code example shown in Table 1.

TABLE 1 if (nationality == "Palauan" and age > 60) f(disease)

Based on the information provided by instrumentation of the code in Table 1, it can be readily determined that the attribute values necessary to satisfy this branch condition are that the value of the nationality variable should be equal to Palauan and the value of the age variable should be greater than 60. However, using a fully anonymized database (e.g., database 106 in FIG. 1) may cause this branch condition to fail, as identified at block 310, and thereby cause the function "f(disease)" to be an uncovered branch. For example, during execution of the code, the instrumentation provides the identifications of all statements that are executed. Based on this information, following execution of the program, it is readily determined which statements were or were not executed. By inspecting those attribute-affected branch conditions that refer to unexecuted code (e.g., as a jump destination of a conditional branch instruction), the attribute values necessary to cause execution of the otherwise unexecuted code are readily determined. In a similar vein, the occurrence of exceptions leads to the provision of error information (again, gathered by the instrumentation), which error information indicates the location of the error, i.e. the last statement executed right before the crash, as well as information about variable values and their relationship with data base attributes. For instance, referring to the example in Table 1, if an exception occurs during execution of this code, the values used in the statement right before the exception are "nationality" and "age", which are related to two data attributes in the database. Based on this information, test engineers can alter these values in the database to avoid future exceptions.

Having identified specific occurrences of exceptions and/or uncovered branches, processing continues at block 312 where it is determined whether the desired level of test coverage has been achieved. This determination is based on counting the number of statements in the instrumented code that have been executed thus far and comparing that with the total number of statements in the code. As described in further detail below, database attributes are determined to have effects on branch conditions in the DCA. Thus, the number of statements that are directly control-dependent on branch conditions that are linked to database attributes are counted. For example, in the case of code created using the "JAVA" programming language, to more accurately reflect the actual number of statements, virtual call resolution using static class hierarchy analysis can be employed, and the biggest number of statements of a method that can be potentially invoked may be counted as a conservative approach. Furthermore, all statements in all target methods may be counted, but only when the call site is the only entry point of that method. In a current implementation, only values of attributes that are used in variables that, in turn, control branches are used. However, those having ordinary skill in the art will appreciate that other statements affected by variable more directly may also be considered.

If the resulting ratio of executed statements to the total number of statements exceeds the threshold designated by the desired level of test coverage, then testing may conclude at block 316 where the ranked attributes and other test results are provided to the DCA owner. If, however, the desired level of test coverage has not been met, processing continues at block 314 where fake data values are added to the fully anonymized database in order to force execution of the uncovered branches and/or to prevent occurrence of the exceptions. Techniques for generating such fake data values and using them in the testing of databases are well known in the art as taught, for example, in "Dynamic test input generation for database applications", M. Emmi et al., ISSTA 2007, pp. 151-162 and "Lessons Learned In Software Testing", C. Kaner et al., John Wiley & Sons, Inc., New York, N.Y. (2001), pp. 114, 116, the entirety of which are incorporated herein by this reference. It is worth noting that the addition of fake database entries at this point is not for the purpose of testing the DCA, or even expanding test coverage, but to enable execution of (sometimes deeply) nested conditional branches in an effort to further link database attributes to specific portions of the DCA and determine their effect.

Having thus augmented the fully anonymized database with suitable fake data entries, processing continues at block 308 where the DCA is once again executed on the basis of the modified fully anonymized database. This process of executing the DCA, identifying and ranking attributes used by the DCA is repeated until the desired level of test coverage is obtained.

As noted above, an output of the processing implemented at block 308 is a plurality of ranked attributes, wherein each attribute is ranked according to the effect of that attribute on the DCA. In one embodiment, those attributes having a relatively lower effect on the DCA are ranked higher (in the sense of being potentially more useful candidates for anonymization processing of the original database), whereas those attributes having a relatively higher effect on the DCA are ranked lower (in the sense of being potentially less useful candidates for anonymization processing of the original database). Based on the ranked attribute received from the testing entity, processing continues at block 318 where the DCA owner selects one or more quasi-identifier attributes from the ranked attributes having the least effect on the DCA. To this end, the DCA owner may employ its subject matter experts (e.g., security experts and/or business analysts) to first determine which of the ranked attributes constitute quasi-identifier attributes. Based on this determination, those quasi-identifier attributes ranked most highly in the ranked attributes are then selected as the basis for selective anonymization of the original database, which is subsequently perform at block 320. In selecting the quasi-identifier(s) for this purpose, the DCA owner will attempt to balance the desired level of privacy protection against the desire to maximize utility of the database for testing purposes.

In this regard, various factors may go into the DCA owner's selection process. For example, using a lesser number of highly ranked quasi-identifier attributes will maximize utility of the data while providing some privacy, whereas using a greater number of highly ranked quasi-identifier attributes will more greatly impact the utility of the data while providing greater privacy. Alternatively, knowledge of how susceptible certain quasi-identifier attributes are to being paired with external data may further inform this decision. Consider an example in which a person's hometown and vehicle identification number (VIN) are identified as potential quasi-identifier attributes, and where the hometown attribute has a greater impact on the DCA. Whereas external data identifying a person's hometown is most likely easy find, external data linking that person to his/her VIN may be more difficult to find. As a result, even though the hometown attribute has a greater impact on the DCA (i.e., database anonymization based thereon is more likely to reduced the utility of the database), it may nevertheless be desirable to select the hometown attribute for anonymization given the likelihood that the hometown attribute could be more readily paired with external data to attack the anonymized database. It will be appreciated that a variety of other context-dependent factors such as these may be factored into the selection of suitable quasi-identifiers for anonymization.

It is further noted that the anonymization technique employed to provide the partially anonymized database at block 320 may be the same as, or different from, the anonymization technique employed at block 304 to provide the fully anonymized database. Regardless, the partially anonymized database ($DB_{PA}$) resulting from anonymization of the original database according to the one or more selected quasi-identifier attributes is then provided to the testing entity at block 322. Although not shown in FIG. 3, the testing entity may thereafter perform comprehensive testing of the DCA based on the partially anonymized database. Because the partially anonymized database is selectively anonymized based on quasi-identifier attributes, the efficacy of the comprehensive testing is maximized while balancing the simultaneous protection of privacy.

Figure 4:
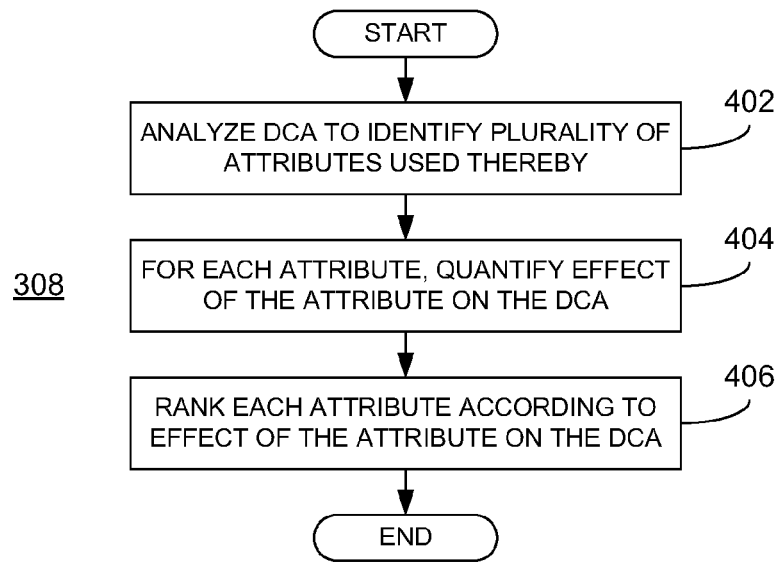
FIG. 4 is a flowchart illustrating operations for ranking a plurality of attributes relative to a given database-centric application in accordance with an embodiment set forth herein.

Referring now to FIG. 4, processing in accordance with an embodiment for ranking a plurality of attributes is further illustrated. In particular, FIG. 4 further illustrates the processing described above relative to block 308 in FIG. 3. As a consequence, the processing illustrated in FIG. 4 is performed based on execution of the instrumented DCA executable or object code using the fully anonymized database (possibly augmented with fake data as described above). Thus, beginning at block 402, the DCA is analyzed to identify database attributes used thereby. In an embodiment, as the DCA is executed, the data gathered by the instrumentation in the DCA code permits database queries to be recognized and captured for analysis. For example, the DCA code may use expressions (queries) set forth according to the so-called Structured Query Language (SQL) language each time data values are obtained from the (in this case) fully anonymized database. Accordingly, use of an SQL parser, as known the art, and knowledge of the database schema permits the identification of <t, a> pairs, where t is a table in the database and a is the attribute of this table referenced in the SQL query. Because the instrumentation permits identification of specific statements in the DCA code, attributes identified in this manner may be associated with specific instructions. As noted above, such identification of specific statements may be accomplished using the identifiers associated with each statement during the instrumentation phase. Various other known techniques may also be employed for this purpose. For example, memory addresses of individual statements (as also tracked by the code instrumentation) may also be used to identify specific statements. Furthermore, as indicated at block 404, the effect of each attribute thus identified on the DCA is quantified.

In an embodiment, the effect of an attribute on the DCA is assessed by determining the influence the attribute has on variables within the DCA code. Such influence may be determined using a process of dynamic variable tainting, wherein a symbolic state of the code is maintained and used to determine specific statements that are affected by a given attribute. Table 2 illustrates a simple example of code execution in which symbolic state data, as well as execution state data, is maintained.

TABLE 2

| Index | Program Code | Execution State | Symbolic State |
|---|---|---|---|
| 1 | a = getFromDB(...); | a = 2 | a = X |
| 2 | b = a * a; | b = 4 | b = X * X |
| 3 | c = 5; | c = 5 | c = 5 |
| 4 | if (b < c); | true | (X * X < 5) |
| 5 | foo( ); | | |

As shown in Table 2, the execution state reflects the actual state of program variables (a, b, c) based on the specific data values, whereas the symbolic state treats the program variables as symbolic literals. Additionally, any values retrieved from the database are treated as symbolic variables instead of symbolic literals. In doing this, any variables derived from a database value are then represented as a symbolic expression that includes the symbolic variable associated with the attribute. Stated another way, assignment of symbolic variables to specific database attributes allows the influence of such attributes to be tracked through the symbolic state representation. For example, the execution depicted in Table 2 retrieves a value from the database in line 1 using, in this case, an application protocol interface (API) call "getFromDB." As shown, the value thus retrieved is represented as a symbolic variable, X. Thereafter, the program uses the value in a computation in line 2 and its result in the following branch condition in line 4. Representing the result of the computation in line 2 with the symbolic expression X*X permits tracing of the influence of the database value on the subsequent branch condition, where it affects the control flow of the program. In an implementation, this determination of the effects of attributes is determined following execution of the DCA code. That, given the symbolic execution information described above, all branch conditions that are influenced by one or more attributes become known and this information is written to a log file. After DCA execution, the log file will contain all the branch statements and how their conditions are influenced by the various attributes. In order to determine a number of statements affected by a given attribute, a control flow graph (CFG) of the DCA (i.e., a representation in graph form of all of the paths that may be taken through the code of the DCA) is first created. Techniques for creating a CFG are well known in the art and do not require further description here. Based on the information in the log file, the CFG is traversed (i.e., each path through the code is followed) to compute how many statement are affected by each of the branches (and, consequently, the attributes that influence those branches) in the log file. In those instances in which a given program variable is affected by more than one attribute, the effect is tabulated for each attribute. For example, if two attributes, A1 and A2, affect a branch that, in turn, affects 20 statement, then the count of statements for both A1 and A2 would be incremented by the same 20 statements.

Having thus identified and quantified the effect of database attributes on the DCA, processing continues at block 406 where each attribute identified thus far is ranked according to its effect on the DCA. For example, as noted above, those attributes having a relatively lower effect on the DCA may be ranked higher, whereas those attributes having a relatively higher effect on the DCA may be ranked lower. It will be appreciated, however, that any suitable ranking scheme that permits the DCA owner to quickly ascertain which quasi-identifier attributes to use for anonymization purposes may be employed.

Figure 5:
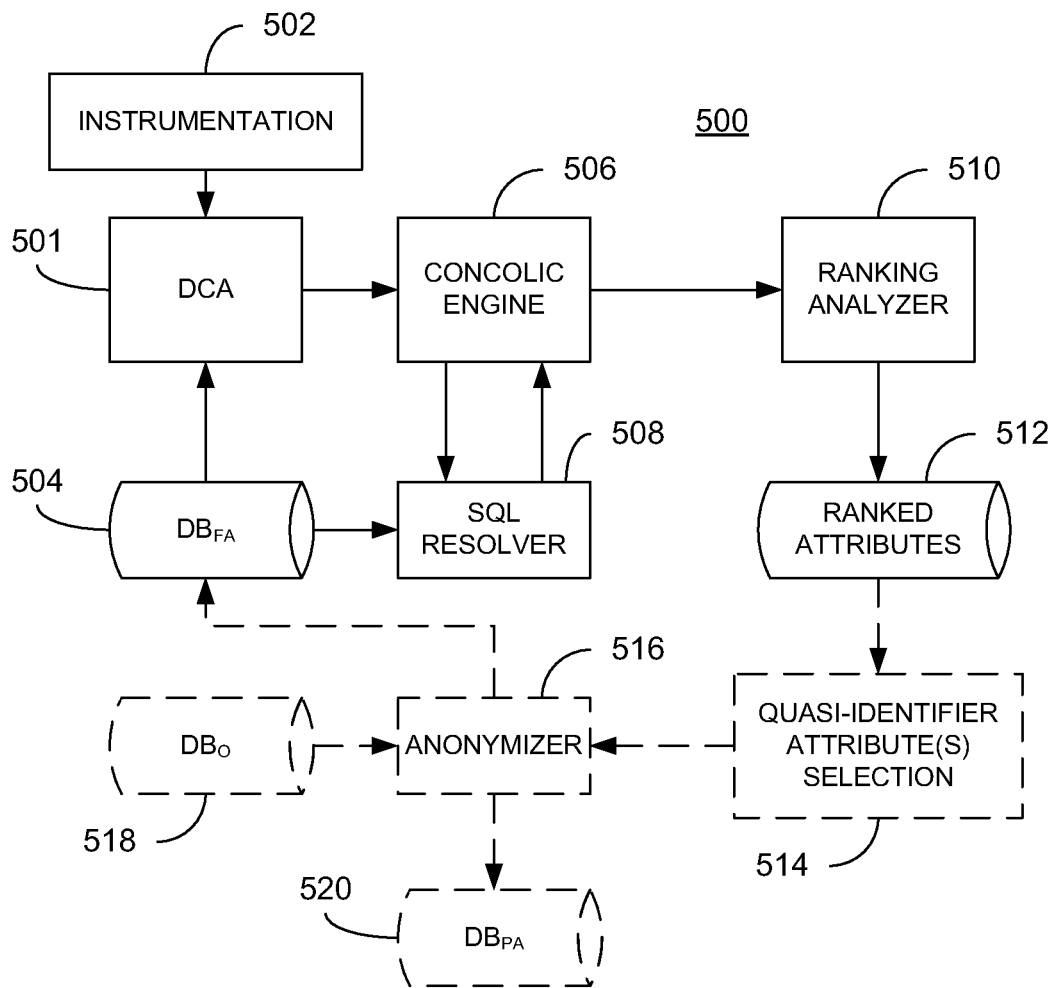
FIG. 5 is a block diagram of a system for use in anonymizing a database in accordance with an embodiment set forth herein.

Referring now to FIG. 5, a system 500 for use in anonymizing a database in accordance with the instant disclosure is further illustrated. In an embodiment, the system 500 may be implemented using one or more processing devices, such as the processing device illustrated in FIG. 2, using known programming techniques. Additionally, in an embodiment, the various components of the system 500 may be distributed between the parties described above. For example, the testing entity may operate/control those components 502-512 illustrated with solid lines, whereas the DCA owner may operate/control those components 514-520 illustrated with dashed lines.

As shown, that portion of the system 500 operated/controlled by the testing entity includes an instrumentation component 502 that, as described above, is used to instrument the executable DCA code or object code 501. As further shown, the fully anonymized database 504 is also provided as input to the testing entity. In practice, the databases described herein may be implemented using suitable database server hardware implementing a database management system (DBMS) as know in the art. As described above, the fully anonymized database 504 is provided by the DCA owner after subjecting an original database 518 ($DB_O$) using an anonymizer component 516. For example, the anonymizer component 516 may be a suitable programmed processing device implementing any of the above-mentioned anonymization techniques such as k-anonymity or l-diversity.

As the DCA 501 is executed based on the fully anonymized database 504, the data obtained by the instrumentation (e.g., the invocation stack, operand stacks, local variables, the heap, as well as the effects of reading and writing any memory location, performing integer and floating point arithmetic, local and inter-procedural control-flow, and handling exceptions) is passed to a concolic engine component 506, which keeps track of the symbolic state of the code as noted above. As known in the art, so-called concolic (meaning a combination of concrete and symbolic code execution) testing may be implemented using, in the case of "JAVA" code for example, the JCUTE concolic engine (available at http://osl.cs.uiuc.edu/~ksen/cute/). As the code is executed, the concolic engine component 506 captures instances of database queries as noted above and passes them to, in the illustrated implementation, an SQL resolver. As shown, the SQL resolver component 508 has access to the fully anonymized database 504 (and its schema) and thereby is able to ascertain the particular attributes (i.e., the <t, a> pairs noted above) referenced in a given database query. For example, the SQL resolver component 508 may be implemented using an SQL parser as known in the art. This attribute information obtained by the SQL resolver component 508 is passed back to the concolic engine component 506 for use in the dynamic tainting analysis described above.

To scale to large, complex applications, memory consumption of the symbolic state representation should be minimized. In a naive implementation, the concolic engine component 506 would represents every concrete computation step by a corresponding symbolic expression, as illustrated in the example of Table 2. Given the large number of computation steps taken by even small applications, this would quickly exhaust all available memory. To minimize memory consumption, the concolic engine component 506 first computes the normal form of each expression, then evaluates it, and finally stores the expression in a cache to avoid creating multiple representations for equivalent concrete expressions. For example, for an integer addition (X*Y)+0, the concolic engine component 506 first reorders the parameters to ensure that the first parameter is a literal, and then evaluates the addition to (X*Y). Assuming this expression already exists in a cache maintained by the concolic engine component 506, the concolic engine component 506 can avoid creating a new symbolic expression to represent the result of this addition.

Simplifying expressions is especially important in layered applications (i.e., applications in which components of the application are divided into layers of increasingly abstracted functionality and where individual layers have only constrained interactions with each other), where values flow in and out of temporary data structures. Specifically, many DCAs use a central database layer that stores database values in arrays and object fields. Table 3 illustrates an example where values flow in and out of an array structure.

TABLE 3

| Program Code | Symbolic State |
| --- | --- |
| v[0] = a; | (0:a) |
| v[1] = b; | (0:a, 1:b) |
| v[x] = c; | (0:a, 1:b, x:c) |
| v[2] = d; | (0:a, 1:b, x:c, 2:d) |
| resv = v[0]; | (0:a, 1:b, x:c, 2:d) |
|  | [0] |

Note that the symbolic array illustrated in the right-hand column of Table 3 is illustrated in the format of "index:value". If the array index x does not contain a symbolic variable, the concolic engine component can simplify the symbolic representation of the result value resv from (0:a, 1:b, x:c, 2:d)[0] to either a or c, depending on the value of x in the given execution.

Regardless, the output of the concolic engine component 506 is a list of all database attributes having an effect on the DCA as well as the symbolic execution data reflecting the tainting of specific code statements according to the dynamic symbols assigned to values obtained from the database 504. This data is provided to a ranking analyzer component 510. In turn, the ranking analyzer component 510 ranks the identified attributes based on how many statements their values affect, as described above, and the ranked list of attributes is outputted to a ranked attributes database component 512.

As further shown in FIG. 5, the resulting ranked attributes 512 are passed back to the DCA owner for selection 514 of the quasi-identifier attribute(s) to be used by the anonymizer component 516 when selectively anonymizing the original database 518 to provide the partially anonymized database 520. As described above, the quasi-identifier attribute selection 514 may be implemented by having DCA owner's subject matter experts review the ranked attributes 512 for this purpose.

As described above, the instant disclosure provides various techniques for improving the anonymization of databases for use in testing DCAs. This is achieved through the use, when performing selective anonymization, of quasi-identifier attributes having the least effect or influence on the DCA, which quasi-identifiers are therefore least likely to negatively affect the utility of the database during testing. In an embodiment, the effect of given attributes on a DCA are isolated by linking attributes to specific portions of the code implementing the DCA, thereby permitting a very direct, empirical representation of each attribute's effect. In this manner, the conflicting requirements of ensuring a suitable level of confidentiality while simultaneously preserving the utility of the database for testing purposes may be balanced as desired.

In essence, the instant disclosure unifies applications and their databases in a novel way: database attributes are tied to the actual code of the DCAs, and the manner in which DCAs use values of these attributes determines what anonymization strategy should be used to protect data while balancing the need to preserve test coverage. Because of this, it is not always necessary to anonymize all of the database attributes to achieve a desired level of data protection. For example, protecting the database of movie ticket buyers may require much lower protection than a database that holds medical information. Using the techniques described herein, these disparate needs for data protection can be balanced to the degree desired in order to maintain the usefulness of each database for testing purposes to the maximum degree possible.

For at least these reasons, the above-described techniques represent an advancement over prior art teachings. While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for optimizing anonymization of a database comprising attributes to be used in testing a database-centric application, the method comprising:
    selecting a quasi-identifier attribute from ranked attributes to provide a selected quasi-identifier attribute, wherein each of the ranked attributes is ranked according to a number of statements in code implementing the database-centric application affected by the ranked attribute, wherein for each of the ranked attributes the number of statements in code implementing the database-centric application affected by the ranked attribute is determined by quantifying the number of statements in code implementing the database-centric application affected by the ranked attribute, and wherein quantifying the effect of each of the ranked attributes includes:
        for each of the ranked attributes, tainting variables used during execution of the database-centric application and affected by the ranked attribute to provide attribute-specific tainted variables, and
        for each of the ranked attributes, determining a number of statements in the database-centric application affected by the ranked attribute based on the attribute-specific tainted variables; and
    anonymizing, by a processor, the database based on the selected quasi-identifier attribute to provide a partially anonymized database.

2. The method of claim 1, wherein the selected quasi-identifier attribute comprises that ranked attribute of the ranked attributes having a least effect on the database-centric application.

3. The method of claim 1, further comprising:
    fully anonymizing the database to provide a fully anonymized database; and
    providing the fully anonymized database and the database-centric application to a testing entity, wherein the testing entity determines the ranked attributes based on execution of the database-centric application using the fully anonymized database.

4. The method of claim 3, further comprising:
    providing a desired test coverage parameter to the testing entity, wherein the testing entity further determines the ranked attributes based on the desired test coverage parameter.

5. The method of claim 1, further comprising:
    providing the partially anonymized database and the database-centric application to a testing entity for functional testing of the database-centric application.

6. An apparatus for optimizing anonymization of a database to be used in testing a database-centric application, the apparatus comprising:
    means for receiving information regarding a selected quasi-identifier attribute from ranked attributes, each of the ranked attributes being ranked according to a number of statements in code implementing the database-centric application affected by the ranked attribute, and for each of the ranked attributes the number of statements in code implementing the database-centric application affected by the ranked attribute being determined by quantifying the number of statements in code implementing the database-centric application affected by the ranked attribute, and quantifying the effect of each of the ranked attributes includes:
        for each of the ranked attributes, tainting variables used during execution of the database-centric application and affected by the ranked attribute to provide attribute-specific tainted variables, and
        for each of the ranked attributes, determining a number of statements in the database-centric application affected by the ranked attribute based on the attribute-specific tainted variables; and
    means for anonymizing the database based on the selected quasi-identifier attribute to provide a partially anonymized database.

7. The apparatus of claim 6, wherein the information regarding the selected quasi-identifier attribute corresponds to that ranked attribute of the ranked attributes having a least effect on the database-centric application.

8. A method in a processing device for determining effect of attributes within a database on a database-centric application, the method comprising:
    analyzing, by the processing device, the database-centric application to identify a plurality of attributes used by the database-centric application by capturing instances of database queries during execution of the database-centric application;
    for each attribute of the plurality of attributes, quantifying, by the processing device, a number of statements in code implementing the database-centric application affected by the attribute, wherein quantifying the effect of each attribute includes:
        for each attribute of the plurality of attributes, tainting variables used during execution of the database-centric application and affected by the attribute to provide attribute-specific tainted variables, and
        for each attribute of the plurality of attributes, determining a number of statements in the database-centric application affected by the attribute based on the attribute-specific tainted variables; and
    ranking, by the processing device, the plurality of attributes according to the number of statements in the code affected by each attribute of the plurality of attributes.

9. The method of claim 8, further comprising:
    inserting, by the processing device, callback instructions before and after substantially all instructions in code implementing the database-centric application,
    wherein execution of the callback instructions provides as output complete execution status of the database-centric application.

10. The method of claim 8, wherein capturing the instances of database queries further comprises executing the database-centric application using a fully anonymized database.

11. The method of claim 8, wherein determining the number of statements affected by the attribute further comprises:

constructing a control-flow graph of the database-centric application; and counting the number of statements affected by the attribute while traversing the control-flow graph.

12. The method of claim 8, wherein ranking the plurality of attributes further comprises:

ranking lower those attributes of the plurality of attributes for which the number of statements is relatively larger; and ranking higher those attributes of the plurality of attributes for which the number of statements is relatively smaller.

13. An apparatus for determining effect of attributes within a database on a database-centric application, comprising:

a processor; and a storage device, operatively connected to the processor, having stored thereon instructions that, when executed by the processor, cause the processor to:

analyze the database-centric application to identify a plurality of attributes used by the database-centric application by capturing instances of database queries during execution of the database-centric application;

for each attribute of the plurality of attributes, quantify a number of statements in code implementing the database centric application affected by the attribute, wherein those instructions that cause the processor to quantify the effect of each attribute are operative to:

for each attribute of the plurality of attributes, taint variables used during execution of the database-centric application and affected by the attribute to provide attribute-specific tainted variables, and for each attribute of the plurality of attributes, determine a number of statements in the database-centric application affected by the attribute based on the attribute-specific tainted variables; and rank the plurality of attributes according to the number of statements in the code affected by each attribute of the plurality of attributes.

14. The apparatus of claim 13, the storage device further comprising instructions that, when executed by the processor, cause the processor to:

insert callback instructions before and after substantially all instructions in code implementing the database-centric application, wherein execution of the callback instructions provides as output complete execution status of the database-centric application.

15. The apparatus of claim 13, wherein those instructions that cause the processor to capture the instances of database queries are further operative to execute the database-centric application using a fully anonymized database.

16. The apparatus of claim 13, wherein those instructions that cause the processor to determine the number of statements affected by the attribute are further operative to:

construct a control-flow graph of the database-centric application; and count the number of statements affected by the attribute while traversing the control-flow graph.

17. The apparatus of claim 13, wherein those instructions that cause the processor to rank the plurality of attributes are further operative to: rank higher those attributes of the plurality of attributes for which the number of statements is relatively smaller.

18. A non-transitory computer readable medium having stored thereon machine readable instructions to optimize anonymization of a database comprising attributes to be used in testing a database-centric application, the machine readable instructions, when executed, cause a processor to:

select a quasi-identifier attribute from ranked attributes to provide a selected quasi-identifier attribute, wherein each of the ranked attributes is ranked according to a number of statements in code implementing the database-centric application affected by the ranked attribute, wherein for each of the ranked attributes the number of statements in code implementing the database-centric application affected by the ranked attribute is determined by quantifying the number of statements in code implementing the database-centric application affected by the ranked attribute, and wherein quantifying the effect of each of the ranked attributes includes:

for each of the ranked attributes, tainting variables used during execution of the database-centric application and affected by the ranked attribute to provide attribute-specific tainted variables, and for each of the ranked attributes, determining a number of statements in the database-centric application affected by the ranked attribute based on the attribute-specific tainted variables; and anonymize the database based on the selected quasi-identifier attribute to provide a partially anonymized database.

19. A non-transitory computer readable medium having stored thereon machine readable instructions to determine effect of attributes within a database on a database-centric application, the machine readable instructions, when executed, cause a processor to:

analyze the database-centric application to identify a plurality of attributes used by the database-centric application by capturing instances of database queries during execution of the database-centric application;

for each attribute of the plurality of attributes, quantify a number of statements in code implementing the database-centric application affected by the attribute, wherein quantifying the effect of each attribute includes:

for each attribute of the plurality of attributes, tainting variables used during execution of the database-centric application and affected by the attribute to provide attribute-specific tainted variables, and for each attribute of the plurality of attributes, determining a number of statements in the database-centric application affected by the attribute based on the attribute-specific tainted variables; and rank the plurality of attributes according to the number of statements in the code affected by each attribute of the plurality of attributes.

\* \* \* \* \*